G. W. HOLLAWAY.
VEHICLE SPRING CONNECTION.
APPLICATION FILED DEC. 14, 1910.
1,007,201.
Patented Oct. 31, 1911.
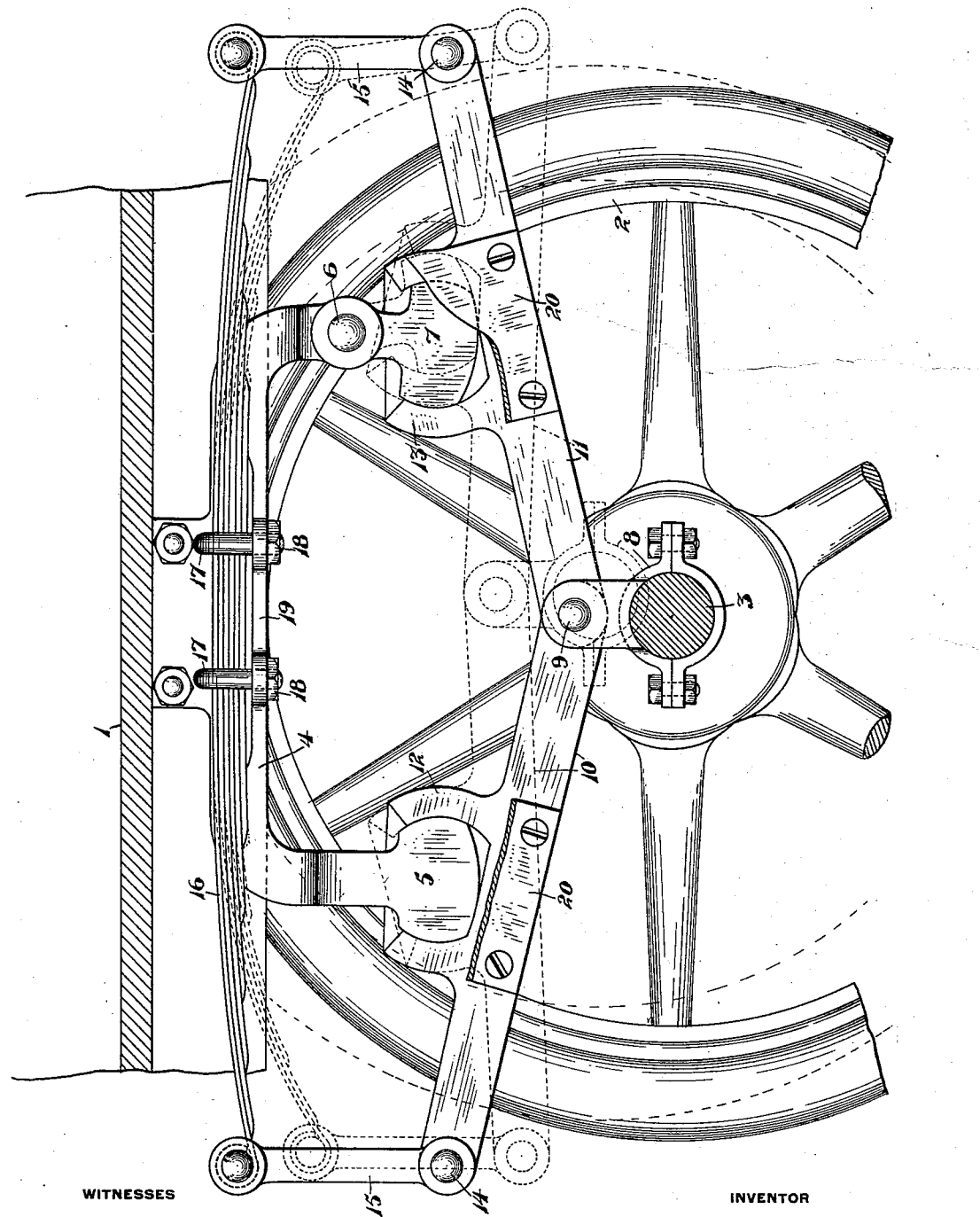
WITNESSES
INVENTOR
Geo. W. Hollaway
By F. M. Wright
Atty.

UNITED STATES PATENT OFFICE.

GEORGE W. HOLLAWAY, OF GILROY, CALIFORNIA, ASSIGNOR OF ONE-HALF TO EDGAR A. HOLLAWAY, OF GILROY, CALIFORNIA.

VEHICLE SPRING CONNECTION.

1,007,201.  Specification of Letters Patent.  Patented Oct. 31, 1911.

Application filed December 14, 1910. Serial No. 597,348.

*To all whom it may concern:*

Be it known that I, GEORGE W. HOLLAWAY, a citizen of the United States, residing at Gilroy, in the county of Santa Clara and State of California, have invented new and useful Improvements in Vehicle Spring Connections, of which the following is a specification.

The present invention relates to an improvement in vehicle spring connections, the object of the invention being to provide a spring connection by means of which the body of the vehicle will be free from vertical oscillations, maintaining substantially the same level at all times, notwithstanding inequalities in the road over which it is traveling.

In the accompanying drawing, the figure is a side elevation, certain parts being broken away, of my improved spring connection applied to the axle of a vehicle, showing in dotted lines the positions of the parts when the vehicle is passing over an obstacle in the road.

Referring to the drawing, 1 indicates a portion of the body of an automobile or other vehicle, 2 indicates a wheel thereof and 3 the axle for said wheel. Secured to the body 1 is a yoke 4, of which one depending end is formed into a stationary fulcrum 5, and the other end has pivoted thereto, as shown at 6, a movable fulcrum 7. Secured to the axle 3 is a clamp 8 to which are pivoted, as shown at 9, the inner ends of levers 10, 11, the upper edges of which are formed with bearings 12, 13, to receive said fulcra 5, 7. The outer ends of the levers are pivotally connected, as shown at 14, with the lower ends of links 15, the upper ends of which links are connected to the ends of a bow-spring 16, the center of which is secured by U-bolts 17, and nuts 18, to an angle plate 19, secured to the center of the yoke 4. Said bearings 12, 13, are open only at the top, and are closed at one side by bearing plates 20.

In operation, when the wheel of the vehicle impinges against an obstruction in the road, an upward impulse is imparted to the inner ends of the levers 10, 11. Owing to the inertia of the vehicle, and its tendency when in motion to continue in the same direction, this upward impulse on the inner ends of said levers, produces substantially no effect at the points of contact of the fulcra with the bearings therefor of said levers, but it produces a downward pull upon the outer ends of the levers, which downward pull has the effect of merely bending the ends of the spring downward. As the inner ends of the levers move upward, and the ends of the spring bend downward and the outer ends of said levers move downward, the fulcra roll upon the upper edges of said levers, the points of contact of said fulcra with said levers changing to positions nearer to the axle. The result of this is to increase the resistance offered by the spring, since said spring operates at longer distances from each fulcrum, while the upward impulse applied to the inner ends of the levers operates at shorter distances therefrom.

Both the stationary and movable fulcra have their lower edges curved in order that the point of contact against the levers may vary according to the magnitude of the load. With a light load each fulcrum will contact with its corresponding lever at the outer portion of the lower edge thereof. As the load is increased, so that the spring is correspondingly bent, the result is to cause the points of contact to change their positions, and move inwardly, thereby giving a greater leverage to the spring, and increasing its effective power to correspond to the greater load which has to be sustained, thus producing the same effect as if the spring were automatically increased with the load.

It will be seen that, on account of the change in angular positions of the levers, the distance between the bearings is increased by the upward movement of their inner ends. It is for this reason that it is necessary to movably connect said fulcrum 7 with the depending end of the yoke 4, and, on account of this movable connection, and the change in angular position of said fulcrum 7, the lower edge of said fulcrum has a greater curvature than that of the fulcrum 5.

I have found that an automobile supplied with devices of this character will travel over depressions in a roadway of a considerable depth without the level of the body of the automobile being substantially varied.

I claim:—

1. In a device of the character described, the combination of a vehicle body, a wheel, and an axle, a bow spring secured at the center to said vehicle body, a fulcrum rigidly connected with said vehicle body on one side of the point of attachment of said spring, a fulcrum movably connected with said body on the other side thereof, levers rocking on said fulcra respectively, links connecting the outer ends of said levers with the free ends of said spring, and means whereby the inner ends of said lever are pivotally connected to said axle, substantially as described.

2. In a device of the character described, the combination of a vehicle body, a wheel, an axle therefor, a bow-spring connected at the center to said vehicle body, a yoke connected to said vehicle body, one end of the yoke being conformed to provide a rolling fulcrum, a second rolling fulcrum pivotally connected to the other end, links connected to the free end of the spring, levers, the outer ends of which are pivotally connected to said links, said levers rocking against said fulcra, and means whereby the inner ends of the levers are pivotally connected to the axle, substantially as described.

3. In a device of the character described, the combination of a vehicle body, a wheel, and an axle, a bow spring secured at the center to said vehicle body, a fulcrum rigidly connected with said vehicle body on one side of the point of attachment of said spring, a fulcrum movably connected with said body on the other side thereof, levers rocking on said fulcra respectively, the lower edges of said fulcra being curved to provide changeable points of contact with the levers, links connecting the outer ends of said levers with the free ends of said spring, and means whereby the inner ends of said lever are pivotally connected to said axle, substantially as described.

4. In a device of the character described, the combination of a vehicle body, a wheel, and an axle, a bow spring secured at the center to said vehicle body, a fulcrum rigidly connected with said vehicle body on one side of the point of attachment of said spring, a fulcrum movably connected with said body on the other side thereof, levers rocking on said fulcra respectively, the lower edges of said fulcrum being curved convexly downward, links connecting the outer ends of said levers with the free ends of said spring, and means whereby the inner ends of said lever are pivotally connected to said axle, substantially as described.

In testimony whereof I have hereunto set my hand in the presence of two subscribing witnesses.

GEORGE W. HOLLAWAY.

Witnesses:
FRANCIS M. WRIGHT,
D. B. RICHARDS.

---

Copies of this patent may be obtained for five cents each, by addressing the "Commissioner of Patents, Washington, D. C."